(12) United States Patent
Parent et al.

(10) Patent No.: US 6,915,172 B2
(45) Date of Patent: Jul. 5, 2005

(54) METHOD, SYSTEM AND STORAGE MEDIUM FOR ENHANCING PROCESS CONTROL

(75) Inventors: Scott R. Parent, Dalton, MA (US); Aaron J. Avagliano, Clifton Park, NY (US); John E. Davis, Westfield, MA (US); Glen Juback, Davis, MI (US); John A. Kaminsky, Rensselaer, NY (US)

(73) Assignee: General Electric, Pittsfield, MA (US)

( * ) Notice: Subject to any disclaimer, the term of this patent is extended or adjusted under 35 U.S.C. 154(b) by 297 days.

(21) Appl. No.: 10/064,852

(22) Filed: Aug. 23, 2002

(65) Prior Publication Data

US 2003/0097197 A1 May 22, 2003

Related U.S. Application Data

(60) Provisional application No. 60/332,220, filed on Nov. 21, 2001.

(51) Int. Cl.[7] .............................................. G05B 13/02
(52) U.S. Cl. ....................................... 700/31; 708/108
(58) Field of Search ............................ 700/28–31, 51, 700/108–110, 121

(56) References Cited

U.S. PATENT DOCUMENTS

| | | |
|---|---|---|
| 4,228,509 A | 10/1980 | Kennedy |
| 4,858,147 A | 8/1989 | Conwell |
| 5,142,612 A | 8/1992 | Skeirik |
| 5,155,677 A | 10/1992 | Kurtzberg et al. |
| 5,339,249 A | 8/1994 | Schaeffer |
| 5,408,405 A * | 4/1995 | Mozumder et al. ........... 700/31 |
| 5,408,586 A | 4/1995 | Skeirik |
| 5,521,814 A | 5/1996 | Teran et al. |
| 5,671,335 A | 9/1997 | Davis et al. |
| 5,727,127 A | 3/1998 | Schulze Horn et al. |
| 5,765,137 A | 6/1998 | Lee |
| 5,864,773 A | 1/1999 | Barna et al. |
| 5,890,133 A | 3/1999 | Ernst |
| 6,085,183 A | 7/2000 | Horn et al. |
| 6,144,885 A | 11/2000 | Scarrah |
| 6,725,121 B1 * | 4/2004 | Pasadyn et al. ............. 700/121 |
| 2002/0070469 A1 | 6/2002 | Hiatt et al. |
| 2002/0107604 A1 * | 8/2002 | Riley et al. ................. 700/121 |

FOREIGN PATENT DOCUMENTS

| | | |
|---|---|---|
| EP | 0 859 299 B1 | 8/1998 |
| WO | WO 01/50208 A1 | 7/2001 |

OTHER PUBLICATIONS

Process Modeling and Control: A Vision of the Future, Thomas F. Edgar, Sep. 2, 1998, pp. 1–11.
European Search Report, EP 03 25 5008, Feb. 4, 2004.

* cited by examiner

*Primary Examiner*—Leo Picard
*Assistant Examiner*—Ryan A. Jarrett (57) ABSTRACT

Disclosed herein is a method for enhancing process control. Disclosed herein is a method for enhancing process control including initiating a manufacturing process to create a product. The initiating includes setting a control on a machine in response to an initial system model. The manufacturing process is tuned in response to the initial system model. The tuning includes running the machine in response to the initial system model, monitoring a primary output parameter of the product and performing an adaptation process while the manufacturing machine is running. The adaptation process includes adjusting the control on the machine, updating the initial system model to define an updated system model in response to adjusting the control and running said machine in response to said updated system model. Additional embodiments include a system and a storage medium for enhancing process control.

23 Claims, 4 Drawing Sheets

METHOD, SYSTEM AND STORAGE MEDIUM FOR ENHANCING PROCESS CONTROL

CROSS REFERENCE TO RELATED APPLICATIONS

This application claims the benefit of U.S. provisional patent application Ser. No. 60/332,220, filed Nov. 21, 2001, the entire contents of which are incorporated herein by reference.

BACKGROUND OF INVENTION

As state-of-the-art products become an essential part of all aspects of today's high tech economy, the quality of such products becomes increasingly important. The control and reproducibility of quality continue to be the focus of efforts to meet the demand of the high tech economy. Process control is used to produce the most consistent product properties in a manufacturing process. Many production lines involve numerous processes to create a product. In production lines where intricate or otherwise information-sensitive manufacturing is performed, quality control is essential. Any number of factors may be significant and affect the quality of the product, and numerous problems may occur as a result of poor quality control.

Process control is very important in controlling the quality of the product. Improper process control can result in a product that is of little value or even useless to the user of the product. In such situations, the manufacturer can suffer (1) by paying the cost of manufacturing useless products, (2) by losing the opportunity to make a profit on an acceptable product, and (3) by lost revenue from a reduced selling price of poor products. Therefore, the success of the process control can even affect whether the manufacturer's business survives or fails.

Mathematical equations can be developed to assist in process control. These equations are developed using test data various forms of mathematical analysis. The equations provide an accurate guide of the manufacturing process. The equations can be used to determine the ranges of acceptable input values, or machine control settings, required to create final products with acceptable output parameter values. One problem with using mathematical equations to set the controls on manufacturing equipment is that the equations tend to shift over time due to environmental changes, degradation, part replacement, etc. In addition, these equations may not be accurate when applied to more than one manufacturing line because of variations between machines. Manufacturing machines typically vary in terms of machine settings. For example, the actual temperature of a machine may be different than the reading on the thermostat attached to the machine. These machine variations make the manufacturing process dependent on operators who are familiar with the specific machines. The operators will make adjustments during the machine set-up process to take into account machine variations and unique characteristics. For example, an operator may know, based on experience with the machine, that a particular manufacturing machine runs a few degrees hotter than the temperature shown on the thermostat. The operator will then set the thermostat a few degrees lower than the temperature specified by the temperature input variable. In this manner, the mathematical equations and therefore machine settings are interpreted and adjusted by operators who are familiar with the specific machines. This can result in mathematical models that are not accurate reflections of the actual manufacturing process.

SUMMARY OF INVENTION

Disclosed herein is a method for enhancing process control including initiating a manufacturing process to create a product. The initiating includes setting a control on a machine in response to an initial system model. The manufacturing process is tuned in response to the initial system model. The tuning includes running the machine in response to the initial system model, monitoring a primary output parameter of the product and performing an adaptation process while the manufacturing machine is running. The adaptation process includes adjusting the control on the machine, updating the initial system model to define an updated system model in response to adjusting the control and running said machine in response to said updated system model. Additional embodiments include a system and a storage medium for enhancing process control.

The above described and other features are exemplified by the following figures and detailed description.

BRIEF DESCRIPTION OF DRAWINGS

Referring now to the figures, which are exemplary embodiments, and wherein the like elements are numbered alike.

DETAILED DESCRIPTION

In an exemplary embodiment, predictive techniques using customized, real-time, online, process monitoring and synchronization data acquisition are used for enhancing process control. A system model is developed using training methods such as design of experiment ("DOE") techniques and continuously adapted to perturbations in the manufacturing environment using real-time process data. In one embodiment, enhanced process control is applied to the manufacture of optical media such as DVD, DVD-R, CD, etc. The system model is adjusted if an output parameter that affects final product yield, referred to as a primary output parameter, is outside of a selected range of values. For other output parameters, referred to as secondary output parameters, the equipment operators may be notified of process guidance information requiring human intervention. For example, the process guidance information may be used by the operators to identify process set point changes and to create a higher performance state for multi-set point optical media processing equipment. Additionally, the techniques described herein allow for increased production output which can include improvements in yield, cycle time, machine uptime, and production efficiencies.

In an exemplary embodiment, through the application of quality improvement analysis techniques, dynamic adaptation techniques and a predictive process optimizer ("PPO") monitoring tool, input process variables may be correlated to quality output parameter measurements recorded for each product manufactured. The PPO monitoring tool manages the production process (e.g., process monitoring, product tracking and process analysis). The PPO monitoring tool may be used to provide plant personnel (e.g., operators to senior managers) visibility and control of the production process so that predictions of variations in production may be made. These predictions may be used to help eliminate scrap, downtime and poor quality. As described herein, the PPO tool may include hardware and software components, optimization algorithms, analysis tools and the like. The PPO tool may be used to provide stable, production performance through continuous process monitoring and tracking of each individual product through all stages of production.

Figure 1:
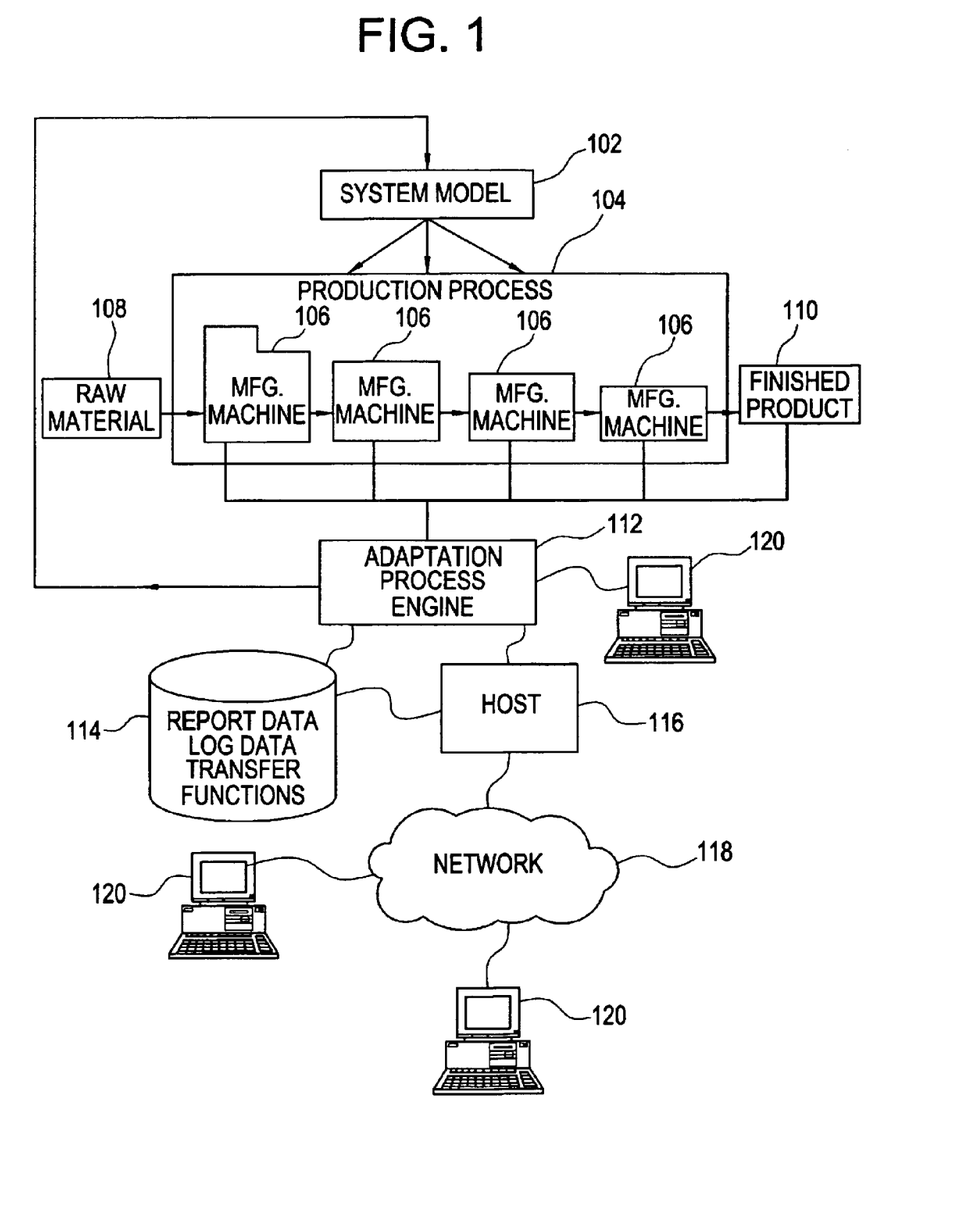
FIG. 1 is a block diagram of a system for optimizing process control.

FIG. 1 is a block diagram of an exemplary embodiment of a system that uses a PPO monitoring tool to enhance process control. The system includes a manufacturing production process 104 that includes one or more manufacturing machines 106. The manufacturing machines can be any that are known in the art and may contain controls that can be set by an operator or by an automated process. Each manufacturing machine performs one or more steps of the production process that starts with input or raw material 108 and results in a finished product 110. The production process 104 is adjusted by the system model 102 which is included in the PPO monitoring tool. The system model 102 specifies the values for manufacturing machine 106 control settings. In an exemplary embodiment, the system model 102 includes one or more multi-variable, transfer functions. The transfer functions may be created using DOE techniques or any other model training methods. Any training technique known in the art can be used to create the transfer functions that predict the quality of the finished product 110 based on fixed and variable input values.

The transfer functions define relationships between output parameters (referred to as Y's), input parameters (referred to as x's) and system parameters (referred to as a's). Mathematically, the transfer function represents:

$$Y_1(t)=f_1(x_1(t), x_2(t), \ldots x_n(t), a_1(t), a_2(t), \ldots a_n(t));$$

where Y is a time dependent output parameter, x is a time dependent input parameter, a is a time dependent system parameter that defines the relationship between x's and Y. An initial system model may be generated using training methods (such as DOE) in which x's and y's are adjusted and measured to derive the system parameters.

In operation, the input parameters (x's) are controlled so that the output parameter (Y) has a desired value. Control of input parameters may be performed through automation or by instructing an operator to adjust a setting (e.g., temperature) on a manufacturing machine. In operation, the system model is used to tune input parameters to maintain output parameters within desired ranges.

Referring to FIG. 1, the adaptation process engine 112 which is included in the PPO monitoring tool, allows the system tool 102 to be updated to more accurately reflect machine-to-product relationships. These variations can be due to numerous factors including machine wear wear, or tooling variations, individual machine characteristics, shift in raw material properties, or long cycle environmental condition changes. The adaptation process engine 112 monitors input information from the manufacturing machines 106 regarding process set points and processing variables. The adaptation process engine communicates with the manufacturing machines using existing protocols (e.g., RS232, RS485, analog, and Ethernet).

The tailored data acquisition system, or database 114, synchronizes, in time and by unique product identification, the inline recorded output qualities to specific input values including set and actual (measured) data for each individual product as it passes through the manufacturing process. This input data is then compared to output quality data being reported by the inline inspection of the finished product 110. In an exemplary embodiment, the inline inspection data includes qualitative and quantitative data. The various input variables and the respective inline responses are then transformed into final product quality predictions. These predictions come from real-time analysis of inspection and process data and the employment of process-to-feature transfer functions. The actual data values are continually applied to the transfer functions and adapted to changing manufacturing conditions. In this manner, the PPO tool can predict quality output changes in real-time, in response to real-time changes in inputs or system perturbations. This system model is then used to recommend process changes or to alert operators of imminent process degradation. The action taken by the PPO tool depends on the type of output parameter that is not within a specified value range.

The output parameters, in an exemplary embodiment, can be divided into two types during system set-up: primary and secondary. Primary output parameters are continuous in nature and a property of a part that can be quantitatively measured for each manufactured piece, such as shape, weight or form. A secondary parameter is an attribute type defect, non-continuous in nature, which may only be present on a "defective" piece. Primary and secondary output parameters will both negatively impact yield if not controlled within a defined range, however primary parameters are quantitatively correlated by transfer functions to key processing parameters being monitored by the line. In an exemplary embodiment, if a primary output parameter is not within a specified value range, the adaptation process engine 112 will cause the transfer functions to be adapted to ensure the primary output parameters are brought back within these parameters. In this manner real-time corrective action is applied without interrupting the manufacturing process.

In an exemplary embodiment, where the finished product 110 is a DVD, primary output parameters could include tilt, spacer layer, birefringence, and reflectivity. Secondary output parameters are values that are classified as attribute or non-continuous type data and include data such as spots, scratches, and bubbles. In an exemplary embodiment, secondary output parameters are displayed on a dashboard screen displayed on a user system 120 and an operator is alerted to imminent process degradation. In addition, "intelligent advisor" software can suggest actions to an operator in order to keep the secondary output parameters within specified value ranges.

As depicted in FIG. 1, an exemplary embodiment of the system includes a host system 116 and a network 118. One or more user systems 120 may be coupled to the host system 116 via the network 118. In addition, one or more user systems 120 may be directly connected to the computer system running the adaptation process engine 112. Each user system 120 may be implemented using a general-purpose computer executing a computer program for carrying out the process described herein. The network 118 may be any type of known network including a local area network (LAN), wide area network (WAN), global network (e.g., Internet), intranet, etc. Each user system 120 and the host system 116 may be connected to the network 118 in a wireless fashion and network 118 may be a wireless network. In another embodiment, the network 118 is the Internet and each user system 120 executes a user interface application (e.g., web browser) to contact the host system 116 through the network 118. Alternatively, the user system 120 may be implemented using a device programmed primarily for accessing the network 118.

The host system 116 may include one or more servers. In one embodiment, a network server (often referred to as a web server) may communicate with the user systems 120. The network server may be implemented using commercially available servers as are known in the art. The network server handles sending and receiving information to and from user systems 120 and can perform associated tasks. The host system 116 may also include a firewall server to prevent unauthorized access to the host system 116, to the adaptation process engine 112, or to the transfer functions. The firewall may also control access to the host system 116 with respect to individuals or companies that are authorized to access the host system 116 and enforce any limitations on the authorized access. For instance, a system administrator typically may have access to the entire system and have authority to update portions of the system. By contrast, a user contacting the host system 116 from a user system 120 would have access to use reporting applications provided by the applications server but not be given authority to alter the applications or data stored in database 114 or run the transfer function driver 102. The firewall server may be implemented using conventional hardware and/or software as is known in the art.

The database 114 may include information regarding, for example, production performance, process set points, quality reports and job tracking. In an embodiment for optimizing process control in the manufacture of a DVD, the database 1114 may include data/information such as inline inspection quality output parameter information (e.g., tilt, spacer layer, birefringence, reflectivity, and the like), data attributed to a production machine's operating state/performance (e.g., actual set points, desired set points and yield-loss characterization), manufacturing data regarding total production (e.g., yield, cycle-time, downtime characterization, job-tracking, and the like), and off-line quality information/follow-up testing and data (e.g., electrical testing, environmental testing trends, visual inspection, and the like). In an exemplary embodiment, the database 114 would also include report data, log data, application programs and transfer functions.

The host system 116 may include an applications server. The applications server may execute a plurality of software applications or modules included in the PPO tool. These modules include the adaptation process engine 112 and the system model 102 as shown in FIG. 1. Alternatively, both of these modules, the adaptation process engine 112 and the system model 102, may be executed on remote systems. These remote systems could be connected to the database 114, to the host 116, to manufacturing machines 106, and to each other using a network such as the one described earlier. Each module may be implemented through a computer program. The computer programs that implement the modules may be stored on an applications server contained in the server 116 or may be stored in a location remote from the server 116.

Another application, included in an exemplary embodiment, is an application that provides reports based on PPO tool data that is stored in the database 114. These reports can be accessed by user systems 120 and can include production reports, downtime reports, yield loss reports and the production dashboard screen. A variety of reports can be created based on date ranges, particular production lines, particular products or a single product can be tracked through the manufacturing process. Other reports can be based on the quality fail log, the downtime log, the system maintenance log, the change order log, and the stamper tracking log. In addition to providing standard reports, an exemplary embodiment allows for user defined reports using the data stored in the database 114.

In an embodiment for the manufacture of DVDs, the PPO monitoring tool may be a remote system used in conjunction with automated processing equipment that has been configured specifically to the needs of any manufacturing process. The PPO monitoring tool may be networked to a manufacturing facility's other software systems including enterprise resource management ("ERP") and supply change management ("SCM") systems. For example, the ERP system may be a system for managing production materials (e.g., deliveries, vendor strategies and material quality). The SCM system may be a system for managing production planning (e.g., schedules, procedures, transactions and production history). Thus, stable material flow and qualified raw materials (via the SCM system), along with stable predictable process controls and product performance/history information (via the PPO monitoring tool), allow for efficient and cost effective production planning.

Figure 2:
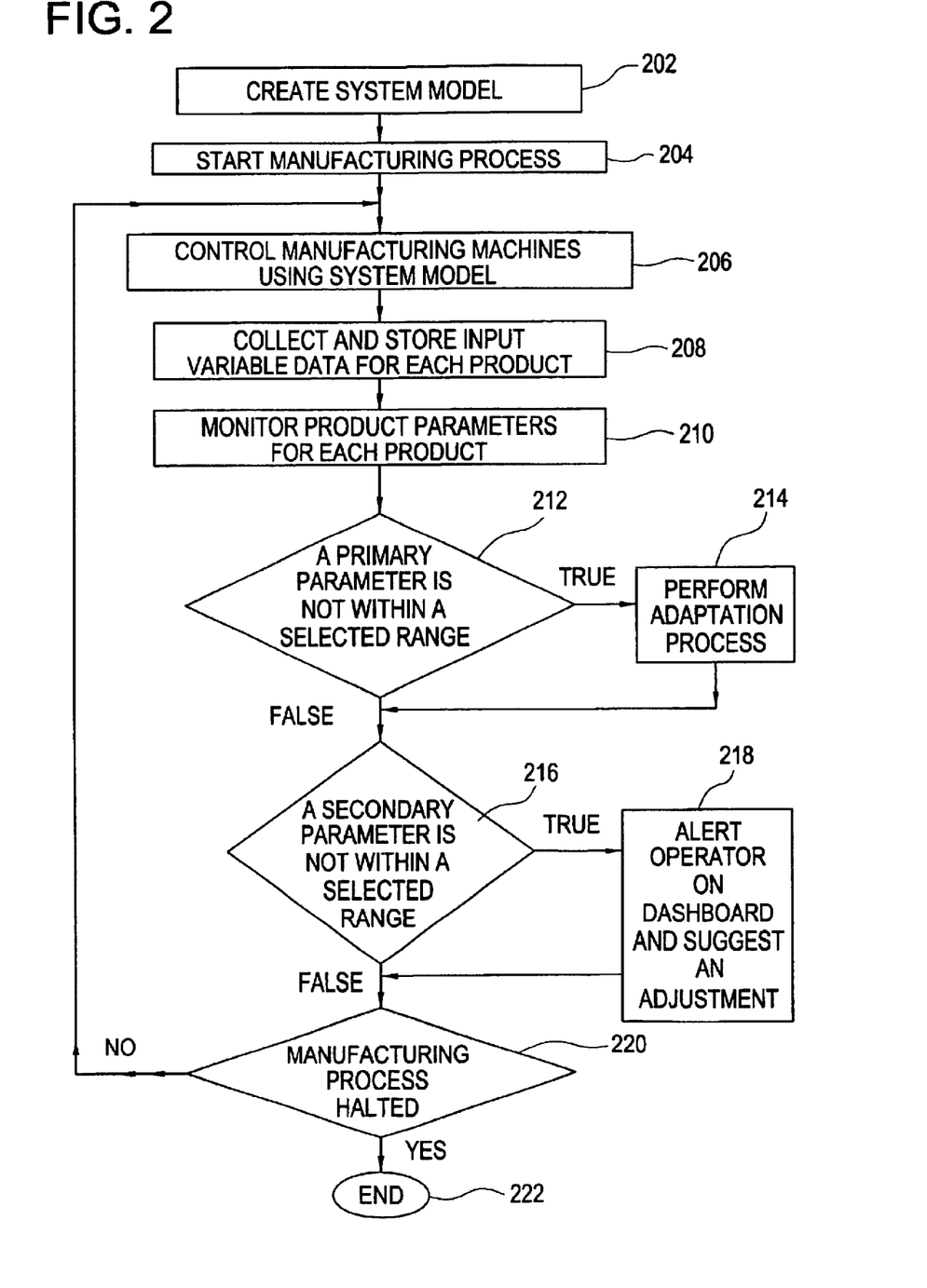
FIG. 2 depicts an overall process flow for optimizing process control.

FIG. 2 depicts an exemplary overall process flow for optimizing process control using a PPO tool. The process begins at step 202 when the system model for the production process 104 is established using existing techniques. Next, at step 204, the manufacturing process is started. This can include setting controls on the manufacturing machines 106 in response to the system model. These controls can be manually set by an operator or automatically set by a system connected to the machine. Step 206 begins the manufacturing process which continues until the manufacturing process is halted at step 220. At step 206, the machines are controlled in response to the initial system model 102.

At step 208 information that includes the input values, sensor data, and quality output data for each individual product being produced is collected and stored in a database 114 for later reporting and analysis. In this way the history, or the input values of a particular product can be traced through the manufacturing process. The collected data is synchronized with the product so that data specific to that part is collected and associated with a specific part. This allows for more detailed analysis than collecting statistical values (e.g., average temperature) over time.

Figure 3:
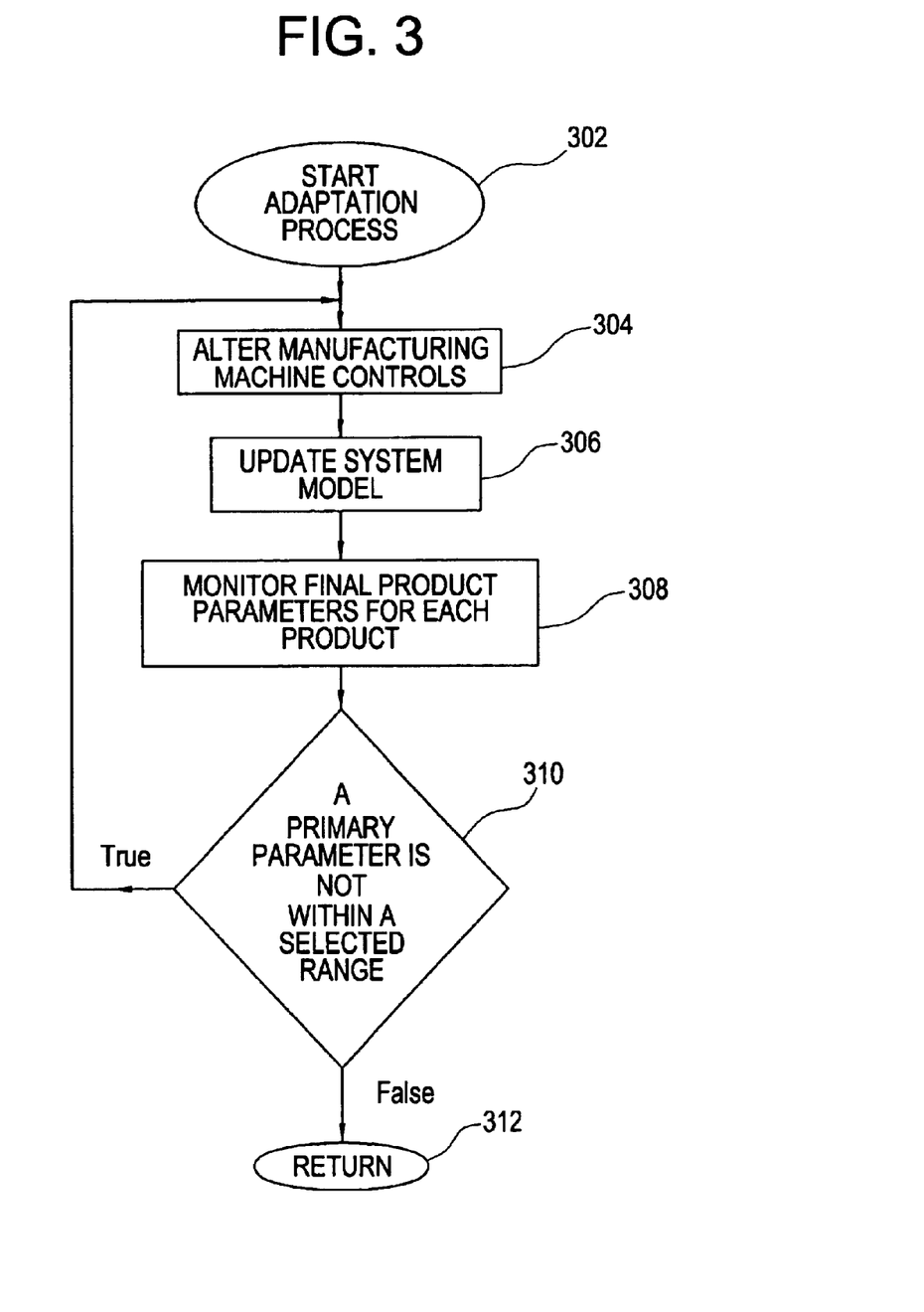
FIG. 3 depicts an adaptation process flow for optimizing process control.

At step 210 product parameters are monitored and compared to expected results. In an exemplary embodiment, these product parameters are measured during quality inspections of the final product at an inspection station. Step 212 tests to see if any of the primary parameters are outside of a selected range of values. The selected range of values can be specified during system set-up and can also be used as input to the initial transfer function creation process. If the primary parameter is not within a selected range, the adaptation process will be performed as depicted in step 214. The adaptation process may result in updates to the system model and is depicted in FIG. 3. Next, at step 216, a test is made to determine if any of the secondary parameters are outside of a selected range of values. If a secondary parameter is outside of a selected range of values, step 218 is performed. At step 218 the operator is alerted on a dashboard, such as the one depicted in FIG. 4, and a suggestion is made to correct the deviation. If the manufacturing process has not been halted as determined at step 220, processing continues with step 206. The loop, from step 206 through step 220, that includes updating the system model to reflect actual operations is performed until the manufacturing process is halted, or process intervention occurs and step 220 is performed.

FIG. 3 depicts an exemplary adaptation process flow for enhancing process control. The adaptation process is started at step 302, when it is called from step 214 in FIG. 2 in response to a primary output parameter being outside a selected value range. At step 304 the manufacturing controls are altered, and at step 306 the system model is updated to reflect the input-to-output relationship. Input parameters, x's, are altered and output parameters, y's, are monitored. The x's and y's are used to update the system parameters (a's) in one or more system model transfer functions, the system parameters defining relationships between x's and the output parameter Y. The system model may be updated by modifying system parameters (a's) or expanding the form of the function $f_i$ (e.g., adding additional terms to function).

At step 308, final product parameters are monitored for each individual product. This updating process continues until the primary parameters are no longer outside a selected range of values as determined at step 310 and the system model correctly predicts the primary output parameter values. Once the primary output parameters are within the selected range, the process returns, at step 312, to step 214 in FIG. 2. The result of this process is that the updated transfer function is now being used to drive the manufacturing process. The process depicted in FIG. 3 is performed while the manufacturing machines are running production and therefore causes no disruption to the manufacturing process.

Figure 4:
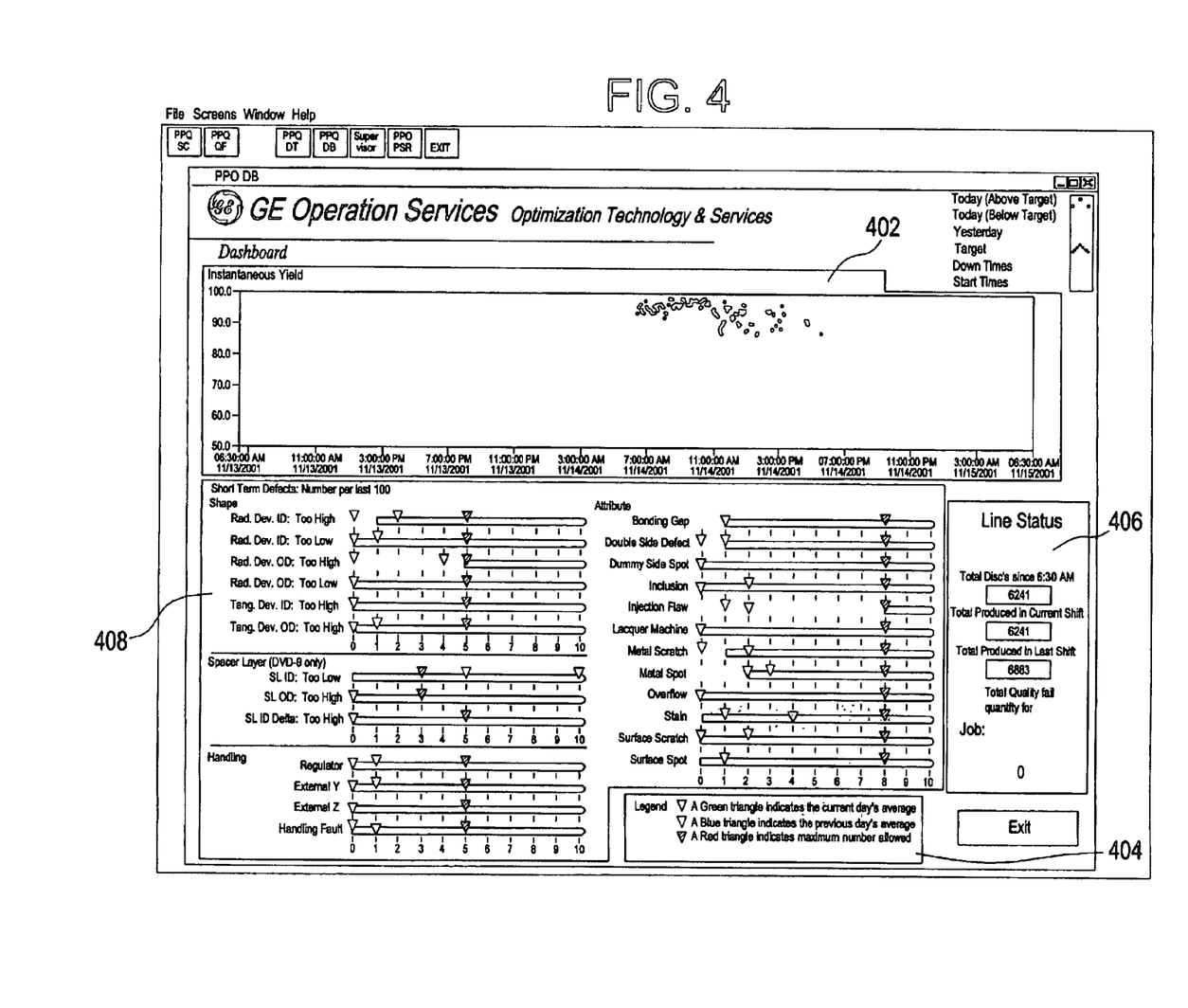
FIG. 4 is a dashboard screen for monitoring secondary parameters.

FIG. 4 is an exemplary dashboard screen for monitoring secondary parameters. This screen is updated with an operator alert message when, at step 216 in FIG. 2, a primary or secondary parameter is determined to be outside of a selected range of values for the parameter. The dashboard screen is designed to alert an operator and to recommend a corrective action in order to prevent future degradation and lost production. The status of the manufacturing line is displayed on the screen along with a count of the number of products produced in various time periods and the total quality fail quantity for a particular job 406. In this exemplary embodiment, the number of final products with defects per last 100 products produced, characterized as "short term yield trend", is tracked against a target level and production time 402. This can show an operator the overall status of the manufacturing line and the quality of the final product being produced. In the bottom half of the screen, secondary parameters are grouped together and tracked 408. A legend 404 is also contained on the dashboard screen. In addition, a corrective action message could be displayed on this screen.

The ability to adapt the system model while the manufacturing operation is being performed reduces downtime and improves yield. An existing system model developed for a production line may be implemented on additional production lines of the same type. Due to variation in production equipment, the initial system model may not be ideal for the additional production lines. In this scenario, the above described adaptation process may be used to adapt the system model to the additional production line. This may be repeated for multiple production lines thereby streamlining process optimization.

An exemplary embodiment of the present invention lessens the dependence of operator knowledge for the unique characteristics of individual machines. In addition, the ability to adapt the transfer functions to the equipment used in a specific production line, while the production line is running, allows the transfer functions to be developed for one production line and then implemented on a second production line. This ability to use the same transfer functions on different manufacturing lines, at the same site or at different sites, eliminates the need to perform the DOE process for each manufacturing line. Using an embodiment of the present invention, any variations between two production lines will be reflected in the transfer functions for a specific implementation over time. The result of adapting the transfer functions can include improved product quality and product yield in addition to making it less costly to implement process control in multiple production lines that contain the same type manufacturing equipment.

The description applying the above embodiments is merely illustrative. As described above, embodiments in the form of computer-implemented processes and apparatuses for practicing those processes may be included. Additional examples may take the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Also included may be embodiments in the form of computer program code, for example, whether stored in a storage medium, loaded into and/or executed by a computer, or as a data signal transmitted, whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. A computer-implemented method for enhancing process control, the method comprising:

initiating a manufacturing process to create a product, wherein said initiating includes setting a control on a machine in response to an initial system model; and tuning said manufacturing process in response to said initial system model, said tuning comprising:

running said machine in response to the initial system model;

monitoring a primary output parameter of said product; and performing an adaptation process while said manufacturing machine is running, wherein said adaptation process is initiated in response to said primary output parameter being outside of a selected primary output parameter value range, the adaptation process including:

adjusting said control on said machine;

updating said initial system model to define an updated system model in response to said adjusting said control; and running said machine in response to said updated system model;

monitoring a secondary output parameter of said product; and alerting an operator if said secondary output parameter is outside of a selected secondary output parameter value range to suggest a process adjustment without initiating said adaptation process.

2. The method of claim 1 wherein said monitoring a secondary output parameter includes displaying a current value for said secondary output parameter.

3. The method of claim 2 wherein said monitoring a secondary output parameter further includes displaying said selected secondary output parameter value range.

4. The method of claim 1 wherein said alerting includes recommending a corrective action to said operator.

5. A computer implemented method for enhancing process control, the method comprising:
  initiating a manufacturing process to create a product, wherein said initiating includes setting a control on a machine in response to an initial system model; and
  tuning said manufacturing process in response to said initial system model, said tuning comprising:
    running said machine in response to the initial system model;
    monitoring a primary output parameter of said product; and
    performing an adaptation process while said manufacturing machine is running, the adaptation process including:
      adjusting said control on said machine;
      updating said initial system model to define an updated system model in response to said adjusting said control; and
    running said machine in response to said updated system model;
  creating a second system model, wherein said second system model is a copy of said initial system model;
  initiating a second manufacturing process to create said product, wherein said initiating a second manufacturing process includes setting a control on a second machine in response to an input value included in said second system model; and
  tuning said second manufacturing process in response to said second system model.

6. The method of claim 1 further comprising creating a process control report.

7. The method of claim 6 wherein said process control report includes production data.

8. The method of claim 6 wherein said process control report includes downtime data.

9. The method of claim 6 wherein said process control report includes yield loss data.

10. The method of claim 6 wherein said process control report includes system maintenance data.

11. The method of claim 6 wherein said process control report includes system change order data.

12. A system for optimizing process control, the system comprising:
  a storage device for storing process control data;
  a manufacturing machine;
  a process control system in communication with said manufacturing machine and said storage device, said process control system implementing a process comprising:
    initiating a manufacturing process to create a product, wherein said initiating includes setting a control on a machine in response to an initial system model; and
    driving said manufacturing process in response to said initial system model, said driving comprising:
      monitoring a primary output parameter of said product; and performing an adaptation process while said manufacturing machine is running, wherein said adaptation process is initiated in response to said primary output parameter being outside of a selected primary output parameter value range, the adaptation process including:
        adjusting said control on said machine;
        updating said initial system model to define an updated system model in response to said adjusting said control; and
        running said machine in response to said updated system model;
    monitoring a secondary output parameter of said product; and
    alerting an operator if said secondary output parameter is outside of a selected secondary output parameter value range to suggest a process adjustment without initiating said adaptation process.

13. The system of claim 12 wherein said monitoring a secondary output parameter includes displaying a current value for said secondary output parameter.

14. The system of claim 13 wherein said monitoring a secondary output parameter further includes displaying said selected secondary output parameter value range.

15. The system of claim 12 wherein said alerting includes recommending a corrective action to said operator.

16. A system for optimizing process control, the system comprising:
  a storage device for storing process control data;
  a manufacturing machine;
  a process control system in communication with said manufacturing machine and said storage device, said process control system implementing a process comprising:
    initiating a manufacturing process to create a product, wherein said initiating includes setting a control on a machine in response to an initial system model; and
    driving said manufacturing process in response to said initial system model, said driving comprising:
      tuning said machine in response to said initial system model;
      monitoring a primary output parameter of said product; and performing an adaptation process while said manufacturing machine is running, the adaptation process including:
        adjusting said control on said machine;
        updating said initial system model to define an updated system model in response to said adjusting said control; and
        running said machine in response to said updated system model;
    creating a second system model, wherein said second system model is a copy of said initial system model;
    initiating a second manufacturing process to create said product, wherein said initiating a second manufacturing process includes setting a control on a second machine in response said second system model; and
    tuning said second manufacturing process in response to said second system model.

17. The system of claim 12 wherein the process implemented by said process control system further comprises creating a process control report.

18. The system of claim 12 further comprising a network providing communication between said process control system and said storage device.

19. The system of claim 12 further comprising a network providing communication between said process control system and said manufacturing machine.

20. The system of claim 12 further comprising a host system in communication with said storage device.

21. The system of claim 20 wherein said host system is in communication with said process control system.

22. The system of claim 20 further comprising a user system in communication with said host system.

23. A storage medium encoded with machine-readable computer program code for optimizing process control, the storage medium storing instructions for causing a process control system to implement a method comprising:

initiating a manufacturing process to create a product, wherein said initiating includes setting a control on a machine in response to an initial system model; and tuning said manufacturing process in response to said initial system model, said tuning comprising:

running said machine in response to said initial system model; monitoring a primary output parameter of said product; and performing an adaptation process while said manufacturing machine is running, wherein said adaptation process is initiated in response to said primary output parameter being outside of a selected primary output parameter value range, the adaptation process including:

adjusting said control on said machine;

updating said initial system model to define an updated system model in response to said adjusting said control; and running said machine in response to said updated system model;

monitoring a secondary output parameter of said product; and alerting an operator if said secondary output parameter is outside of a selected secondary output parameter value range to suggest a process adjustment without initiating said adaptation process.

* * * * *